Patented Jan. 12, 1932

1,840,445

UNITED STATES PATENT OFFICE

FAY H. GUERNSEY, OF CLEVELAND, OHIO, ASSIGNOR TO THE ELECTRIC SMELTING & ALUMINUM COMPANY, OF CLEVELAND, OHIO

TITRATION METHOD AND TABLET THEREFOR

No Drawing.   Application filed October 22, 1929.   Serial No. 401,617.

This invention relates to the testing of hypochlorite solutions to ascertain the strength thereof.

Heretofore, the testing of hypochlorite or bleaching solutions to ascertain the quantity of available chlorine which is the equivalent of the strength of the solution, has been possible only by the use of relatively elaborate and expensive volumetric apparatus, the use of which requires the services of a trained technician.

An object of the invention is to provide an improved method and means by which a nontechnical operator may determine the strength of commercial hypochlorite solutions, without complicated or elaborate apparatus, or extensive knowledge and experience in performing chemical processes; with which results may be obtained which are sufficiently accurate for commercial purposes; with which a minimum number of mathematical calculations will be required; with which only calculations of simple multiplication will be required to calculate the strength of a solution; with which the possibility of errors in the testing of a solution will be reduced to a minimum; with which the testing may be easily carried out, and which will be relatively simple, dependable, safe and inexpensive.

Various other objects and advantages will be apparent from the following description of an example of the invention, and the novel features will be particularly pointed out hereinafter in connection with the appended claims.

In accordance with this invention, a suitable reducing agent such as a thio-sulphate of an alkali metal is produced in tablet form and of standard strength, the tablets having a suitable excipient, such as starch, talcum or stearic acid, to dilute the active material and lubricate the mass so that it will not stick to the punches and dies in the tablet machine. Such tablets are added one by one to a prepared solution containing a standard quantity of the solution of unknown strength to be tested. By determining the number of tablets required to effect the titration of the solution, the strength of the solution can be quickly and easily calculated directly, such as by the mere multiplication of the number of tablets required by a known factor which is determined by the quantity of standard reducing agent incorporated in each tablet.

The preparation of the tablets may be carried out in any suitable manner. For example, the reducing agent, the excipient and any other ingredient may be mixed together as a paste, dried and granulated, and then compressed into tablets in the usual manner. I have found that sodium thio-sulphate is a satisfactory reducing agent for this purpose, and this thio-sulphate may be incorporated in tablets with active and inert excipients.

I prefer to include in each tablet a quantity of a medium which will accelerate the disintegration of the tablet when the tablet is placed in a liquid. Any of the known effervescing materials frequently used for effervescent tablets, may be used for this purpose. I have found that sodium bicarbonate is a satisfactory and inexpensive medium for this purpose, and may be incorporated in the tablet in any desired quantity. A quantity of starch may also be incorporated in each tablet, as an excipient and also as an indicating medium to assist in the titration. The tablets so prepared should have such standardized grainage and proportion that each tablet is equivalent to a selected percentage of available chlorine when a hypochlorite solution is titrated with the tablets.

The technique commonly employed in the use of such tablets is as follows: A known quantity of a sample of the hypochlorite solution to be tested is measured out and placed in a suitable container. A simple but accurate method of measuring such a solution is by the use of a pipette of standard capacity, or by a bruette. This measured sample of the hypochlorite solution may be diluted somewhat with water, and a few crystals of potassium iodide added. This solution is rendered acid in any suitable manner, such as by the use of acetic or other suitable acid. The tablets are now added one by one, each tablet being allowed to disintegrate before the next tablet is added, the liquid being agitated during the disintegration of the tablets in order to insure uniform distribution of the reducing agent contained in the tablet throughout the sample solution. The acid of the solution will react with the bicarbonate of soda in the tablets and accelerate the disintegration of the tablet. The gas liberated in the reaction upon the bicarbonate of soda will also agitate the solution.

Assuming first that the tablets do not contain starch, the addition of tablets is continued until the brown coloration is discharged or eliminated. If starch is included in the tablets, or added to the solution, the addition of tablets is continued until the blue coloration is discharged or eliminated. Knowing the number of tablets required to eliminate the color in the solution, one can readily calculate the strength of the hypochlorite solution in a simple manner, such as by multiplying the number of tablets required to discharge or eliminate the color by a known factor depending upon the standard quantity of reducing agent in each tablet, and by properly determining the factor, the answer can be obtained directly in terms of percentage, grams per litre, etc., by such a simple multiplication.

It is not even necessary that the non-technical operator know the capacity of the pipette or other measuring unit. All that the operator needs to ascertain is the number of tablets required, and the factor used with those tablets, and then the answer may be obtained by simple multiplication following the titration or by reference to a simple chart.

The potassium iodide, which is normally colorless may be added to the solution in any desired quantity, and is used to liberate iodine which imparts a brown color to the solution, if no starch is present, and a blue color, if starch is present.

According to this process, the operator really calculates the amount of iodine released and not the available chlorine directly. In other words, the analysis is based on the fact that a hypochlorite by oxidation will liberate quantitative amounts of iodine from potassium iodide, and by determining the amount of iodine released, one may readily calculate back and ascertain the oxidation value of the hypochlorite which was the real purpose of the test or titration. The chemical reactions involved in the determinations are believed to be as follows:

$$2NaOCl + 2CH_3COOH = 2NaCOOH + H_2O + Cl_2$$
$$Cl_2 + 2KI = 2KCl + I_2$$
$$I_2 + Na_2S_2O_3 = 2NaI + Na_2S_4O_6$$

By the use of these tablets, a laundryman or textile man may easily and quickly ascertain the strength of a hypochlorite solution, so as to avoid excessive damage to textiles. For example, the use of a hypochlorite solution having a strength greater than one per cent is commonly considered dangerous to textiles and should not be used in laundry work at the temperatures employed. At the same time the laundryman should be certain that the solution is strong enough to possess the proper stain removing qualities. This invention provides means to accomplish this determination with sufficient accuracy.

The only apparatus required with this invention is a simple measuring unit, a receptacle and the tablets, and the operator need not even know the character of the reactions taking place.

It will be obvious that various changes in the details and materials, which have been herein recited in order to explain the nature of the invention, may be made by those skilled in the art within the principle and scope of the invention as expressed in the appended claims.

Claims:

1. A titration tablet containing a standard quantity of a thiosulphate of an alkali metal, an excipient, and a medium which will accelerate disintegration of the tablet and agitation of an acidic liquid when the tablet is placed in that liquid, the thiosulphate having such standardized grainage and proportion that each tablet is equivalent to a selected percentage of available chlorine when a hypochlorite solution is titrated with the tablets, whereby a non-technical operator may titrate a measured standard quantity of a hypochlorite solution by addition of the tablets one by one to the solution and then calculate the strength of the hypochlorite solution by multiplying the number of tablets required in the titration by a known factor to give the strength directly.

2. A titration tablet containing a standard quantity of a reducing agent, an excipient and a medium which in the presence of an acidic liquid will accelerate disintegration of the tablet and agitation of that liquid, when the tablet is placed in a liquid, each tablet having therein such grainage and proportion of the agent that it is equivalent to a selected percentage of available chlorine when an acidic hypochlorite solution is titrated with the tablets, whereby a non-technical operator may titrate a measured standard quantity of a hypochlorite solution by the addition of the tablets one by one to the solution and then calculate the strength of the hypochlorite solution by multiplying the number of tablets required in the titration by a known factor to give the strength directly.

3. A titration tablet containing an inert excipient, sodium bi-carbonate, and a standard quantity of sodium thiosulphate, whereby a non-technical operator may titrate a measured standard quantity of a hypochlorite solution whose strength is to be tested, by the addition of the tablets to such solution one by one, and then calculate the strength of the hypochlorite solution by multiplying the number of tablets required in the titration by a known factor to give the strength directly.

4. A titration tablet containing a standard quantity of a thiosulphate of an alkali metal, an excipient, and a quantity of starch a substance which when the tablet is placed in an acid liquid will accelerate disintegration of the tablet and agitation of that liquid.

5. A titration tablet comprising a thiosulphate of an alkali metal, sodium bicarbonate and starch.

6. A process of calculating the oxidation value of a hypochlorite solution, which comprises rendering the solution acid, adding potassium iodide to the solution, and adding tablets containing a thiosulphate of an alkali metal of standardized grainage and bicarbonate of soda, one by one, to said solution until the color disappears, whereby one can directly calculate the strength of the hypochlorite solution by the relative number of tablets required.

7. A process for calculating the oxidation value of a hypochlorite solution, which comprises rendering the solution acid in the presence of available combined iodine, and measuring the quantity of free iodine released by the addition to the solution of tablets, each containing a standardized quantity of a thiosulphate of an alkali metal with bicarbonate of soda, the tablets being added one by one at intervals long enough to enable disintegration of the tablets and agitation of the solution by the escape of gas from the soda, whereby the strength of the hyopchlorite solution will be indicated by the number of tablets required to eliminate the color caused by the free iodine.

FAY H. GUERNSEY.